United States Patent [19]

Deyrup

[11] E Patent Number: Re. 32,334

[45] Reissued Date of Patent: Jan. 20, 1987

[54] MOLDING RESINS

[75] Inventor: Edward J. Deyrup, Northeast, Md.

[73] Assignee: E. I. Du Pont de Nemours and Company, Wilmington, Del.

[21] Appl. No.: 839,455

[22] Filed: Mar. 11, 1986

Related U.S. Patent Documents

Reissue of:

[64] Patent No.: 4,352,904
Issued: Oct. 5, 1982
Appl. No.: 631
Filed: Jan. 5, 1979

U.S. Applications:

[63] Continuation of Ser. No. 496,938, May 23, 1983, abandoned, which is a continuation-in-part of Ser. No. 882,219, Feb. 28, 1978, abandoned.

[51] Int. Cl.[4] ..... C08K 5/12

[52] U.S. Cl. ..... 524/292; 524/167; 524/168; 524/170; 524/173; 524/205; 524/230; 524/233; 524/296; 524/287; 524/297; 524/361; 524/365

[58] Field of Search ..... 524/292

[56] References Cited

U.S. PATENT DOCUMENTS

| | | | |
|---|---|---|---|
| 3,368,995 | 2/1968 | Furukawa et al. | 260/40 |
| 3,435,093 | 3/1969 | Cope | 260/857 |
| 3,516,957 | 6/1970 | Gray, Jr. et al. | 260/22 |
| 3,547,872 | 12/1970 | Weissermel et al. | 260/40 |
| 3,575,931 | 4/1971 | Sherman | 260/75 |
| 3,639,527 | 2/1972 | Brinkmann et al. | 260/873 |
| 3,668,169 | 6/1972 | Brinkmann, Jr. | 260/31.8 |
| 4,223,125 | 9/1980 | Bier et al. | 528/303 |

FOREIGN PATENT DOCUMENTS

| | | |
|---|---|---|
| 2014770 | 10/1970 | Fed. Rep. of Germany . |
| 2706128 | 8/1977 | Fed. Rep. of Germany . |
| 1117139 | 6/1968 | United Kingdom . |
| 1303606 | 1/1973 | United Kingdom . |

*Primary Examiner*—Paul R. Michl

[57] ABSTRACT

Polyethylene terephthalate resin compositions containing filler or reinforcing agent, a selected sodium or potassium salt of a hydrocarbon acid or a salt of a selected organic polymer containing pendant carboxyl groups, and a selected low molecular weight organic ester, ketone, sulfone, sulfoxide, nitrile or amide. Articles molded from the compositions have high gloss when molded at temperatures below 110° C.

17 Claims, No Drawings

MOLDING RESINS

Matter enclosed in heavy brackets [ ] appears in the original patent but forms no part of this reissue specification; matter printed in italics indicates the additions made by reissue.

CROSS REFERENCE TO RELATED APPLICATIONS

This application *is a continuation Ser. No.* 496,938 filed May 23, 1983, now abandoned, which is a continuation-in-part of application of application Ser. No. 882,219, filed Feb. 28, 1978, now abandoned.

FIELD OF THE INVENTION

This invention relates to polyethylene terephthalate resins useful in molding applications. More particularly, this invention relates to polyethylene terephthalate resins containing an inorganic reinforcing or filler material.

BACKGROUND

It is desirable to enhance the strength of articles molded from polyethylene terephthalate resin by employing a reinforcing material such as glass fibers, asbestos fibers or other fibrous mineral materials with a coupling agent, in the resin. Furthermore, it is sometimes sufficient to merely increase the modulus by use of a filler, such as beads or a mineral of low aspect ratio, in the resin. However, heretofore, it was necessary to use very high mold temperatures, on the order of 130° C., to obtain molded articles from such reinforced or filled resins which had a glossy surface and which were not rough in texture. If these high mold temperatures were not employed, the molded articles had a rough surface with poor gloss. It is believed that the crystallization rate of polyethylene terephthalate is too slow below about 130° C. to result in a molded article having good surface characteristics.

While good surface characteristics can be obtained at molding temperatures of 130° C. or more, the use of such temperatures is not practical in the molding field, for most molds are heated with water and attain temperatures of only about 85°-110° C.

A few molding devices employ heating means such as oil to reach temperatures higher than 85°-110° C. but these generally are inconvenient to use and still either do not generally reach such temperatures or reach them unevenly because of inadequate coring. Because of these heating problems, it has proven commercially unattractive to employ these high temperature molding devices with reinforced or filled polyethylene terephthalate resins.

SUMMARY OF THE INVENTION

It is desirable to provide a reinforced or filled polyethylene terephthalate resin that can be molded at mold temperatures below about 110° C. to produce a molded article having a smooth and glossy surface. The reinforced or filled polyethylene terephthalate resins of this invention achieve the foregoing by having incorporated therein (1) a sodium or potassium salt of a selected hydrocarbon acid or a sodium or potassium salt of a selected organic polymer containing pendant carboxyl groups and (2) a selected low molecular weight organic ester, ketone, sulfone, sulfoxide, nitrile or amide.

Specifically, the resins of this invention are compositions consisting essentially of:

A. polyethylene terephthalate having an intrinsic viscosity of at least about 0.4;

B. between about 10 and about 60 percent by weight reinforcing or filling material;

C. a material selected from a sodium or potassium salt of a hydrocarbon acid containing between about 7 and 25 carbon atoms, or a sodium or potassium salt of an organic polymer which contains pendant carboxyl groups, said material present in an amount sufficient to provide a $\Delta H_H/\Delta H_c$ ratio of less than 0.25 to a mixture of components A, B and C;

D. a compound present in an amount sufficient to provide a Tpk at least 4° C. lower than the Tpk of a mixture of components A, B and C, said compound being selected from (a) organic esters selected from the product of an aromatic carboxylic acid of 7-11 carbon atoms containing at least 1 carboxyl group per aromatic nucleus, and an alcohol selected from those of the formula $(HOCH_2\rangle_x R'$ wherein x is 1, 2 or 3 and R' is a hydrocarbon radical of 2-15 carbon atoms (preferably 2-10 carbon atoms) or those of the formula $HO\langle R''O\rangle_y R'''$ wherein y is a cardinal number between 1 and 15 and preferably between 2 and 8, R'' is a hydrocarbon radical of 2-15 carbon atoms (preferably 2-8 carbon atoms) and R''' is —H or a hydrocarbon radical of 2-20 carbon atoms (preferably 2-12 carbon atoms); or (b) organic ketones of the formula $$RC(=O)R$$

(c) organic sulfones of the formula RSOOR (d) organic sulfoxides of the formula $R_2SO$ (e) organic nitriles of the formula RCN, or (f) organic amides of the formula $$RC(=O)NR'R \text{ or}$$

$$RS(=O)NR'R$$

wherein in formulas (b) through (f) each R can be the same as or different from any other R and is a hydrocarbyl group of 1-25 carbon atoms, while in the formulas in (f) R' is hydrogen or a hydrocarbyl group of 1-25 carbon atoms.

DESCRIPTION OF THE INVENTION

The polyethylene terephthalate employed herein is one which has an inherent viscosity of at least 0.4 as measured by ASTM D-2857. The polyethylene terephthalate preferably has an upper limit on inherent viscosity of about 1.2. Inherent viscosity is measured in a 3:1 by volume ratio of methylene chloride and trifluoroacetic acid at 30° C. The polyethylene terephthalate can contain minor amounts of other comonomers such as diethylene glycol or glutaric acid.

The reinforcing or filler material employed herein include glass fibers, glass beads, aluminum silicate, asbestos, mica and the like, or combinations thereof as for example a mixture of mica and glass fibers.

Materials present in an amount sufficient to cause the compositions of the invention to have a $\Delta H_H/\Delta H_c$ ratio of less than 0.25 (component C defined above) include the sodium or potassium salts of hydrocarbon carboxylic acids containing between 7 and 25 carbon atoms, preferably more than 12 carbon atoms. Representative of these acids (which are fatty acids) are stearic, pelargonic, and behenic acid. These materials also include the sodium or potassium salts of carboxyl containing organic polymers, such as copolymers of olefins and acrylic or methacrylic acids, or copolymers of aromatic olefins and maleic anhydride. Preferably these materials include the sodium or potassium salt of stearic acid; the sodium or potassium salt of ethylene/methacrylic acid copolymers (including both wholly or partially neutralized salts e.g., at least about 30% neutralized), the sodium salt of styrene/maleic anhydride copolymers (including both wholly or partially neutralized salts e.g., at least about 30% neutralized) and sodium versatate. In the copolymers listed above the olefin or aromatic olefin moiety ordinarily comprises 50–98 percent by weight of the copolymer, and preferably 80–98 percent. An especially preferred material is the sodium salt of ethylene/methacrylic acid copolymer. The copolymers may be prepared by conventional high pressure polymerization technology.

Preferred organic esters of component D recited above are those in which the aromatic carboxylic acids are hydrocarbon acids containing 1–3 carboxyl groups and the alcohols are aliphatic. In other words, the R groups in the alcohols are alkyl or alkylene depending upon the particular R group. Preferably also when the carboxylic acids contain two or more carboxyl groups, the carboxyl groups are all reacted to form ester (COO) linkages, that is, there will be no free carboxyl groups present in the ester. Preferably, all the hydroxyl groups of the alcohols will also be reacted to form ester (COO) linkages, that is, there will be no free hydroxyl groups present in the ester.

A preferred class of esters are those in which the acid is benzoic acid, and the alcohol is $(HOCH_2)_2—R'$ wherein R' is alkylene of 4–6 carbon atoms (preferably neopentyl glycol) or $HO(R''O)_yH$ wherein R'' is ethylene or propylene, and y is 2 or 3.

Preferred ketones, sulfones, sulfoxides, nitriles and amides are those in which the R groups in the formulas provided further above for these organic compounds are aryl groups of 6–10 carbon atoms or alkyl groups of 1–10 carbon atoms.

Specific compounds within these definitions are listed following (The number in parenthesis after each compound is the number of degrees centigrade that 1 percent by weight of the compound present (based on polyethylene terephthalate) in the reinforced or filled polyethylene terephthalate lower the Tpk): dibenzoate of neopentyl glycol (2.0), dibenzoate of triethylene glycol (3.0), dibenzoate of diethylene glycol (3.2), dibenzoate of dipropylene glycol (3.0), tris-2-ethyl hexyl trimellitate (2.5), phenyl benzoate (3.0), trimethylolethane tribenzoate (1.53), dioctylphthalate (1.3), diisodecyl phthalate (0.8), benzophenone (2.5), 4-fluorobenzophenone (1.9), diphenyl sulfone (2.8), N-ethyl-o,p-toluene sulfonamide (2.3), tolyl sulfoxide (2.6), lauryl nitrile (2.9), and erucyl nitrile (2.3).

Components (C) and (D) in the compositions of this invention aid in obtaining molded articles of high surface gloss at molding temperatures below 110° C. by increasing the rate of crystallization of polyethylene terephthalate. Component (C) is believed to primarily aid in increasing the rate of crystallization while component (D) is believed to primarily improve the mobility of the polyethylene terephthalate in its supercooled state by reducing the viscosity in such state. Both are necessary to obtain the high gloss found in the articles molded from the composition.

The amount of component (C) present in the compositions of this invention is an amount which will result in a $\Delta H_H/\Delta H_c$ ratio of the composition less than 0.25. To find the $\Delta H_H/\Delta H_c$ ratio, polyethylene terephthalate is molded at 70° C. into 1/16" thick bars. The bars are heated and at between 95° C. and 120° C. an exotherm (termed $\Delta H_H$) is recorded on a differential scanning calormeter (DSC) cell attached to a Du Pont 900 Differential Thermal Analysis (DTA) device. The bar is heated to 290° (which is above its melting point) and the melted sample cooled at 10° C./minute. Another exotherm at between about 200°–220° C. (termed $\Delta H_c$) is the exotherm recorded on freezing of the sample. It has been found that the $\Delta H_H/\Delta H_c$ ratio is a convenient method of measuring the degree of crystallization.

The Tpk of the composition of this invention is the temperature at which heat evolves most rapidly during the heating cycle recited in the previous paragraph. As stated earlier the amount of component (D) present in the composition of this invention is an amount which lowers the Tpk of the composition by at least 4° C. over that of an identical composition that does not contain component (D).

The upper limits on the amounts of components C and D are not critical. However, physical properties may become adversely affected as amounts increase. In general, the upper amount employed for any one component will usually be about 12 percent by weight based on weight polyethylene terephthalate, while the lower limit will be about 1 percent. For the preferred component (C) salts of ethylene/methacrylic acid copolymer the upper limit on the amount present will be about 12 percent by weight based on weight of polyethylene terephthalate while the lower limit will be about 0.5 percent, but preferably an amount within the range of 1–5 percent will be used.

In addition to the components discussed hereinabove, the compositions of this invention may contain additives commonly employed with polyester resins, such as colorants, mold release agents, antioxidants, ultraviolet light stabilizers, flame retardants and the like. Additives which improve physical properties, such as tensile strength and elongation can also be employed; such additives include epoxy compounds (e.g., an epoxy compound formed from bisphenol-A and epichlorohydrin) present in amounts of from 0.1–1.5 percent by weight based on weight of composition.

The compositions of this invention are prepared by blending the components together by any convenient means. Neither temperature nor pressure are critical. For example, the polyethylene terephthalate can be mixed dry in any suitable blender or tumbler with components B, C and D and the mixture melt-extruded. The extrudate can be chopped and mixed with reinforcing agent and then this mixture melt extruded. More conveniently, all the components can be mixed dry in any suitable blender or tumbler and the mixture then melt extruded.

The following Examples describe the best mode of carrying out the invention. The $\Delta H_H/\Delta H_c$ ratio and the Tpk were determined as described above, while the gloss of molded sample was measured with a Gardner Multi Angle Gloss (Model GG-9095) set at a selected degree angle set forth in the Examples.

EXAMPLE 1

A dry blend of 92.57 percent by weight of dry polyethylene terephthalate having an inherent viscosity of about 0.5 to 0.6, 1 percent by weight sodium stearate, 5 percent by weight benzophenone, and 1.43 percent by weight N-stearyl erucamide (a mold release additive) was extruded through a 28 mm twin screw extruder at a melt temperature of approximately 264° C. The chopped strands from the extruded melt were dried at about 110° C. for 16 hours in a vacuum oven. The dried chopped strands were dry mixed with sufficient OCF 419AA glass fiber (chopped to 3/16") to make 30 percent glass fiber by weight and extruded through a 2-stage single screw extruder at about 264° C. melt temperature. The $\Delta H_H/\Delta H_c$ ratio was 0.06 and the Tpk was 12° less than the same composition but without the benzophenone present. The extruded strands were cooled and chopped and then dried at about 110° C. for 16 hours in a vacuum oven. The dried chopped strands were molded in a 6 oz. injection molding machine at approximately 290° C. with a fast ram, 20 seconds injection forward time, and 20 seconds mold close time and a 95° C. cavity temperature. Gloss of the molded article was very good. As determined with a Gardner Multi Angle Gloss Meter (Model GG-9095) set at a twenty degree angle the gloss registered 23. At a 70° cavity temperature gloss measured in the same manner was 5.

EXAMPLES 2 TO 15 AND COMPARISON A TO F

In the Examples and comparisons which follow, the procedure generally employed to make compositions of this invention is as follows:

Dry polyethylene terephthalate having an inherent viscosity of about 0.5–0.65 was mixed manually with glass fiber as specified in the tables below and with ethylene/methacrylic acid copolymer (85/15 by weight) which had been 60 percent neutralized with sodium (which is component C herein) in an amount specified in the tables below and with the component D specified in the tables. Other additives may be present to improve strength of molded articles or to improve mold release properties. These additives, if present, are specified in the tables.

The resulting mixture was then extruded through a two-stage two inch single screw extruder at a melt temperature of 285° C. and at a vacuum of 28 inches. The extruded strand was cut and the resulting resin pellets dried at 110° C. in a vacuum oven for about 16 hours. The resin pellets were then molded into tumblers that were 9.2 cm high, 7.5 cm in diameter at the top, 5.5 cm in diameter at the bottom and which had a wall thickness of 0.19 cm. Melt temperature in the molding machine was 295° C.; while the surface temperature of the mold was 85° C. Cycle times and release pressures are recited in the tables.

Gloss was measured at an angle of 60° by the Gardner Multi Angle Gloss Meter (Model GG-9095) several times for each sample. Gloss was measured around the circumference of the tumbler, at one-third the way down from the top. Pressure needed to release the tumbler was also measured by recording the air pressure necessary to move the ejector. The tables record the highest and the lowest gloss figures obtained in all the gloss tests performed on the sample. The tables also record the visual surface appearance of the molded tumblers.

In the tables, percent amount of components C and D are based on weight of polyethylene terephthalate employed. Percent amount of filler or reinforcing agent and other additives are based on weight of mixture that is to be extruded.

In the tables, component D is identified by a single letter. The letters represent the specific component D as follows:

A—Dibenzoate of neopentyl glycol
B—Lauryl nitrile
C—Dibenzoate of dipropylene glycol
D—Erucyl nitrile
E—Benzophenone
F—Trioctyl trimellitate
G—Diphenyl sulfone
H—N-ethyl-o,p-toluene sulfonamide
I—Dibenzoate of diethylene glycol The reinforcing or filler material employed is identified in tables by two letters. The letters represent the specific materials as follows:

AA—OCF 277B glass fiber
BB—Mica (Suzorite A60) platelets
CC—OCF 419AA glass fiber The other additives are identified by letter as follows:

X—epoxy formed from bisphenol A and epichlorohydrin
Y—tetrakis [methylene (3,5-di-tert-butyl-4-hydroxyhydroxycinnamate)] methane

TABLE I

| EXAMPLE | AMOUNT OF COMPONENT C (%) | COMPONENT D AND AMOUNT (%) | FILLER AND AMOUNT (%) | OTHER ADDITIVES PRESENT (%) |
|---|---|---|---|---|
| 2 | 5.8 | A(5.7) | AA(25) | X(0.6) Y(0.3) |
| 3 | 5.8 | A(5.4) | AA(35) | X(0.55) Y(0.25) |
| 4 | 5.9 | A(5.4) | AA(55) | X(0.5) Y(0.18) |
| 5 | 5.7 | A(5.3) | BB(30) | NONE |
| 6 | 5.8 | A(5.6) | CC(25) | NONE |
| 7 | 6.1 | A(11.6) | CC(25) | NONE |
| 8 | 5.6 | B(2.8) | CC(25) | NONE |
| 9 | 5.8 | C(5.7) | AA(25) | X(0.6) Y(0.3) |
| 10 | 5.8 | D(4.3) | CC(25) | SAME |
| 11 | 2.1 | E(5.1) | CC(25) | NONE |
| 12 | 5.7 | F(3.7) | CC(25) | NONE |
| 13 | 5.8 | G(5.3) | CC(25) | NONE |
| 14 | 5.8 | H(5.3) | CC(25) | NONE |
| 15 | 5.7 | I(3.7) | CC(25) | NONE |

TABLE 2

| Ex | $\Delta H_H/\Delta H_c$ | ΔTpk | CYCLE TIME | RELEASE PRESSURE (psi) | GLOSS AS MOLDED (lowest value/highest value) | MOLDED SURFACE APPEARANCE |
|---|---|---|---|---|---|---|
| 2 | 0.16 | −11 | 10/15 | 920 | 61/67 | very smooth |
| 3 | 0.16 | −10 | 10/10 | 940 | 52/60 | very smooth |
| 4 | 0.16 | −10 | 10/13 | 70 | 24/42 | very smooth |
| 5 | 0.16 | −10 | 10/30 | 370 | 27/32 | very smooth |
| 6 | 0.16 | −11 | 10/15 | 1060 | 62/69 | very smooth |
| 7 | 0.16 | −24 | 10/15 | 1080 | 58/62 | smooth all over |
| 8 | 0.16 | −8.1 | 10/15 | 720 | 63/67 | smooth all over |
| 9 | 0.16 | −17 | 10/10 | 970 | 55/65 | very smooth |
| 10 | 0.16 | −10 | 10/15 | 440 | 51/54 | very smooth |
| 11 | 0.16 | −13 | 10/15 | 1730 | 56/63 | very smooth |
| 12 | 0.16 | −9.3 | 10/15 | 1150 | 14/40 | smooth |
| 13 | 0.16 | −15 | 10/20 | 1230 | 24/58 | very smooth |
| 14 | 0.16 | −12 | 10/25 | 1290 | 20/40 | smooth |
| 15 | 0.16 | −12 | 10/15 | 1430 | 64/70 | very smooth all over |

In the following comparisons, the same general procedure was employed as was used in the preceding examples, and the tables which follow contain the same column headings as the tables above. Component C was varied in the comparisons and is listed for each comparison.

TABLE 3

| COMPARISON | COMPONENT C (%) | COMPONENT D (%) | FILLER | OTHER ADDITIVES (%) | $\Delta H_H/\Delta H_c$ | ΔTpk | CYCLE TIME | RELEASE PRESSURE (psi) | GLOSS lowest/highest | MOLDED SURFACE APPEARANCE |
|---|---|---|---|---|---|---|---|---|---|---|
| A | NONE | A(5.4) | AA(25) | X(0.6) Y(0.3) Talc(0.7) | About 0.4 | Not Measured | 10/15 | 2150 | 29/38 | very rough |
| B | Material Used in Examples 2-15(5.5) | NONE | CC(25) | N—stearyl Erucamide Mold Release Agent(0.9) | Not Measured | 0 | 10/30 | 1440 | 13/23 | moderately rough surface |
| C | NONE | E(10) | CC(25) | NONE | About 0.5 | Not Measured | 10/30 | had to spray mold | 36/47 | rough surface |
| D | Sodium Stearate (0.5) | NONE | CC(25) | Methyl Stearate (0.53) | Not Measured | Not Measured | 10/25 | 1590 | 16/23 | very rough surface |
| E | Material Used in Examples 2-15(5.5) | A(1.4)* | CC(25) | NONE | 0.16 | −3 | 10/30 | 1790 | 9/18 | smooth to moderately rough |
| F | Material Used in Examples 2-15(0.35) | E(5.0) | CC(25) | NONE | About 0.45 | Not Measured | Sticking/No molding cycle established | Spray | 5/8 | very rough |

*Amount is too small

Although gloss values for some of the experiments in Table 3 is in the range of gloss values found for some of the Examples in Table 2, the surface roughness is not acceptable in the experiments of the Comparisons.

I claim:

1. A molding composition which provides articles having smooth, glossy surfaces on release from a mold consisting essentially of:

A. polyethylene terephthalate having an inherent viscosity of at least about 0.4;

B. between about 10 and about 60 percent by weight reinforcing or filling material;

C. a material selected from a sodium or potassium salt of a hydrocarbon acid containing between about 7 and 25 carbon atoms, or a sodium or potassium salt of an organic polymer which contains pendant carboxyl groups, said material present in an amount sufficient to provide a $\Delta H_H/\Delta H_c$ ratio of less than 0.25 to a mixture of components A, B and C;

D. a compound present in an amount sufficient to provide a Tpk at least 4° C. lower than the Tpk of a mixture of components A, B and C, said compound being selected from (a) organic esters selected from the product of an aromatic carboxylic acid of 7-11 carbon atoms containing at least 1 carboxyl group per aromatic nucleus which is attached directly to said nucleus, and an alcohol selected from those of the formula $(HOCH_2)_xR'$ wherein x is 1, 2 or 3 and R' is a hydrocarbon radical of 2-15 carbon atoms or those of the formula $HO(R''O)_yR'''$ wherein y is a cardinal number between 1 and 15, R'' is a hydrocarbon radical of 2-15 carbon atoms, and R''' is —H or a hydrocarbon radical of 2-20 carbon atoms, (b) organic ketones of the formula $$\overset{O}{\overset{\|}{RCR}},$$

(c) organic sulfones of the formula RSOOR,
(d) organic sulfoxides of the formula $R_2SO$,
(e) organic nitriles of the formula RCN, or
(f) organic amides of the formula $$\overset{O}{\overset{\|}{RCNR'R}} \text{ or } \overset{O}{\overset{\|}{RSONR'R}};$$

wherein in formulas (b) through (f) each R can be the same as, or different from, any other R and is a hydrocarbyl group of 1–25 carbon atoms, while in the formulas in (f) R′ is hydrogen or a hydrocarbyl group of 1–25 carbon atoms.

2. The composition of claim 1 wherein Component C is the sodium or potassium salt of an organic polymer which contains pendant carboxyl groups.

3. The composition of claim 1 wherein Component C is the sodium or potassium salt of a copolymer of an olefin and acrylic or methacrylic acid.

4. The composition of claim 1 wherein Component C is the sodium salt of a copolymer of ethylene and methacrylic acid in which at least 30% of the carboxyl groups are neutralized with sodium.

5. The composition of claim 1 wherein Component D is an organic ester selected from the organic esters defined in claim 1.

6. The composition of claims 2, 3 or 4 wherein Component D is an organic ester selected from the product of an aromatic carboxylic acid of 7–11 carbon atoms containing 1–3 carboxyl groups per aromatic nucleus and an alcohol selected from those of the formula $(HOCH_2\rightarrow_x R'$ wherein x is 1, 2 or 3 and R′ is alkyl of 2–10 carbon atoms when x is 1 and R′ is alkylene of 2–10 carbon atoms when x is 2 or 3, or those of the formula $HO\leftarrow R''O\rightarrow_y R'''$ wherein y is a cardinal number of between 1 and 8, R″ is alkylene of 2–8 carbon atoms and R‴ is —H.

7. The composition of claims 2, 3 or 4 wherein Component D is an ester selected from the product of benzoic acid and an alcohol of the formula $(HOCH_2\rightarrow_2 R'$ wherein R′ is alkylene of 4–6 carbon atoms or $HO(R''O\rightarrow_y H$ wherein R″ is ethylene or propylene, and y is 2 or 3.

8. The composition of claims 1, 3 or 5 wherein Component B is glass fiber.

9. The composition of claims 1, 3 or 5 wherein Component B is glass fiber and which contains 0.1 to 1.5 percent by weight of an epoxy compound.

10. An article having a smooth glossy surface molded from the composition of claims 1, 2, 3, 4, or 5.

11. A process for manufacturing a molded article having a smooth, glossy surface which comprises shaping a composition defined in claims 1, 2, 3, 4, or 5 in a mold at a surface mold temperature of below 110° C.

12. A molding composition which provides articles having smooth, glossy surfaces on release from a mold consisting essentially of A. polyethylene terephthalate having an inherent viscosity of at least about 0.4;
B. between about 10 and about 60 percent by weight reinforcing or filling material;
C. a material selected from a sodium or potassium salt of a hydrocarbon acid containing between about 7 and 25 carbon atoms, or a sodium or potassium salt of an organic polymer which contains pendant carboxyl groups, said material present in an amount sufficient to provide a $\Delta H_H/\Delta H_c$ ratio of less than 0.25 to a mixture of components A, B and C;
D. A compound present in an amount sufficient to provide a Tpk at least 4° C. lower than the Tkp of a mixture of components A, B and C, said compound being selected from
(a) organic esters selected from the class consisting of
(i) an ester of the product of benzoic acid and an alcohol of the formula $(HOCH_2\rightarrow_2 R'$ wherein R′ is alkylene of 4–6 carbon atoms or $HO(R''O\rightarrow_y H$ wherein R″ is ethylene or propylene and y is 2 or 3;
(ii) tri-2-ethyl hexyl trimellitate;
(iii) phenyl benzoate;
(iv) trimethylolethane tribenzoate;
(v) dioctylphthalate;
(vi) diisodecylphthalate;
(b) organic ketones of the formula $$\overset{O}{\overset{\|}{RCR}},$$

(c) organic sulfones of the formula RSOOR,
(d) organic sulfoxides of the formula $R_2SO$,
(e) organic nitriles of the formula RCN, or
(f) organic amides of the formula $$\overset{O}{\overset{\|}{RCNR'R}} \text{ or } \overset{O}{\overset{\|}{RSONR'R}};$$

wherein the formulas (b) through (f) each R can be the same as, or different from, any other R and is a hydrocarbyl group of 1–25 carbon atoms, while in the formulas in (f) R′ is hydrogen or a hydrocarbyl group of 1–25 carbon atoms.

*13. A molding composition which provides articles having smooth, glossy surfaces on release from a mold consisting essentially of:*

*A. polyethylene terephthalate having an inherent viscosity of at least about 0.4;*
*B. between about 10 and about 60 percent by weight reinforcing or filling material;*
*C. at least one salt selected from the sodium and potassium salts of hydrocarbon carboxylic acids containing between about 7 and 25 carbon atoms, and the sodium and potassium salts of a carboxyl containing organic polymer, said salt present in an amount sufficient to provide a $\Delta H_H/\Delta H_c$ ratio of less than 0.25 to a mixture of components A, B and C;*
*D. at least one compound present in an amount sufficient to provide a Tpk at least 4° C. lower than the Tpk of a mixture of components A, B and C, said compound being selected from*
*(a) organic esters selected from the product of an aromatic carboxylic acid of 7–11 carbon atoms containing at least 1 carboxyl group per aromatic nucleus which is attached directly to said nucleus, and an alcohol selected from those of the formula $(HOCH_2)_x R'$ wherein x is 1, 2 or 3 and R′ is a hydrocarbon radical of 2–15 carbon atoms or those of the formula $HO(R''O)_y R'''$ wherein y is a cardinal number between 1 and 15, R″ is a hydrocarbon*

*radical of 2–15 carbon atoms, and R''' is —H or a hydrocarbon radical of 2–20 carbon atoms,*

*(b) organic ketones of the formula*

$$\overset{O}{\overset{\|}{R}}CR,$$

*(c) organic sulfones of the formula RSOOR,*

*(d) organic sulfoxides of the formula $R_2SO$*

*(e) organic nitriles of the formula RCN,*

*(f) organic amides of the formula*

$$\overset{O}{\overset{\|}{R}}CNR'R \text{ or } \overset{O}{\overset{\|}{R}}SONR'R;$$

*wherein in formulas (b) through (f) each R can be the same as, or different from, any other R and is a hydrocarbyl group of 1–25 carbon atoms, while in the formula in (f) R' is hydrogen or a hydrocarbyl group of 1–25 carbon atoms.*

*14. The composition of claim 13 wherein Component C is at least one salt selected from the sodium and potassium salts of a carboxyl containing organic polymer.*

*15. The composition of claim 14 wherein Component D is at least one organic ester selected from the organic esters defined in claim 13.*

*16. An article having a smooth, glossy surface molded from the composition of claim 13, 14 or 15.*

*17. A process for manufacturing a molded article having a smooth, glossy surface which comprises shaping a composition defined in claim 13, 14 or 15 in a mold at a surface mold temperature of below 110° C.*

* * * * *